Figure 3:
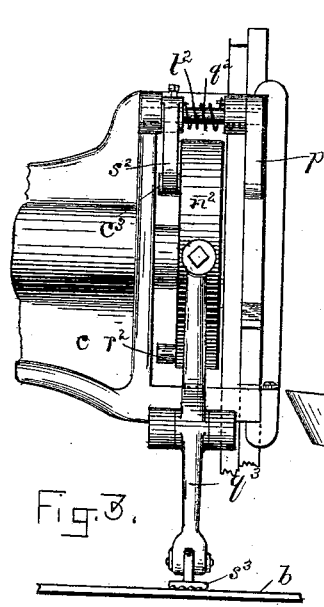

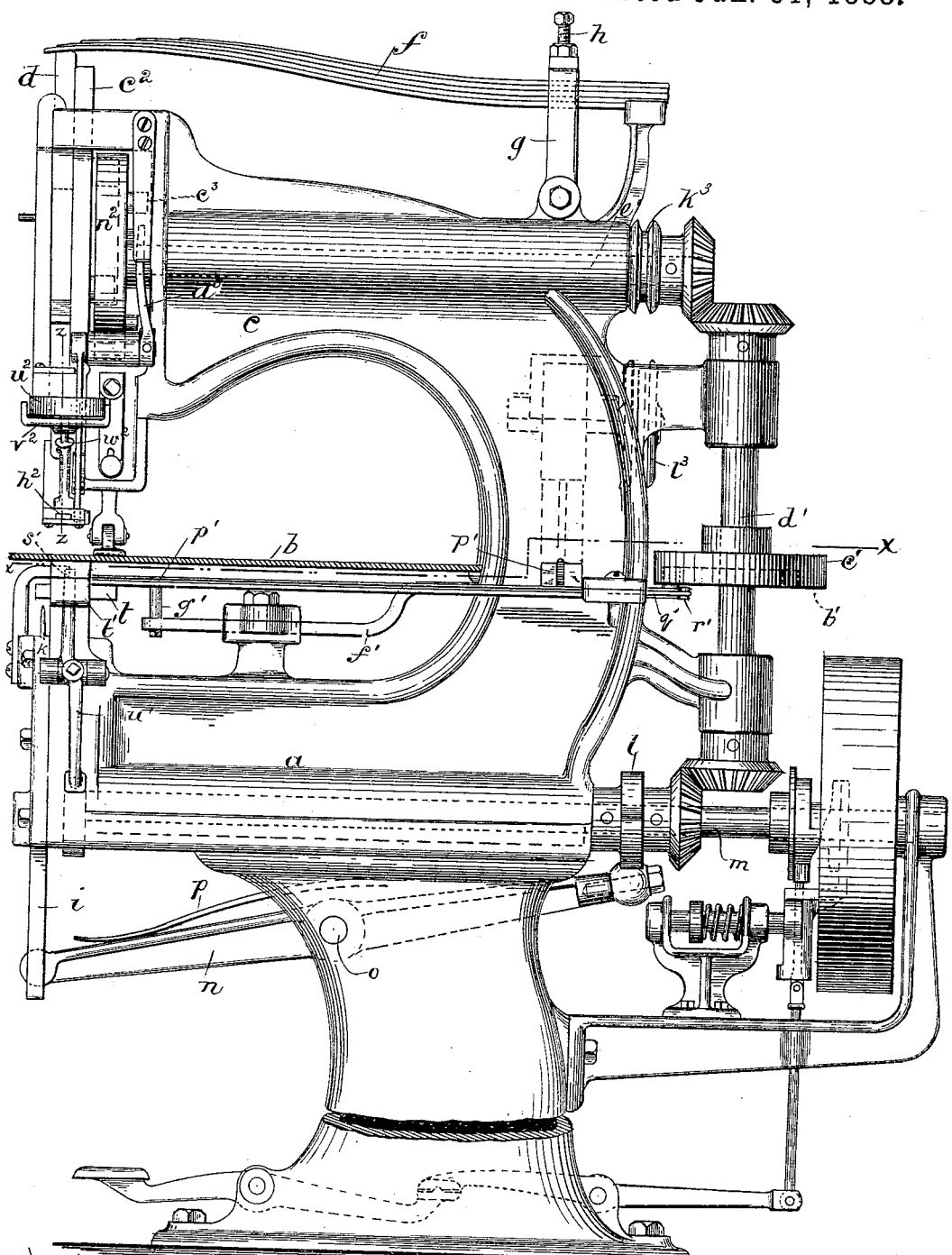

(No Model.) 6 Sheets—Sheet 2.
J. L. SAXE, N. M. SEELYE & F. W. COY.
RIVETING MACHINE.

No. 377,051. Patented Jan. 31, 1888.

WITNESSES:
C. S. Gooding
H. Brown

INVENTORS:
J. L. Saxe
N. M. Seelye
F. W. Coy
by Wight, Brown & Crosley, Attys.

N. PETERS, Photo-Lithographer, Washington, D. C.

(No Model.) 6 Sheets—Sheet 3.
J. L. SAXE, N. M. SEELYE & F. W. COY.
RIVETING MACHINE.
No. 377,051. Patented Jan. 31, 1888.
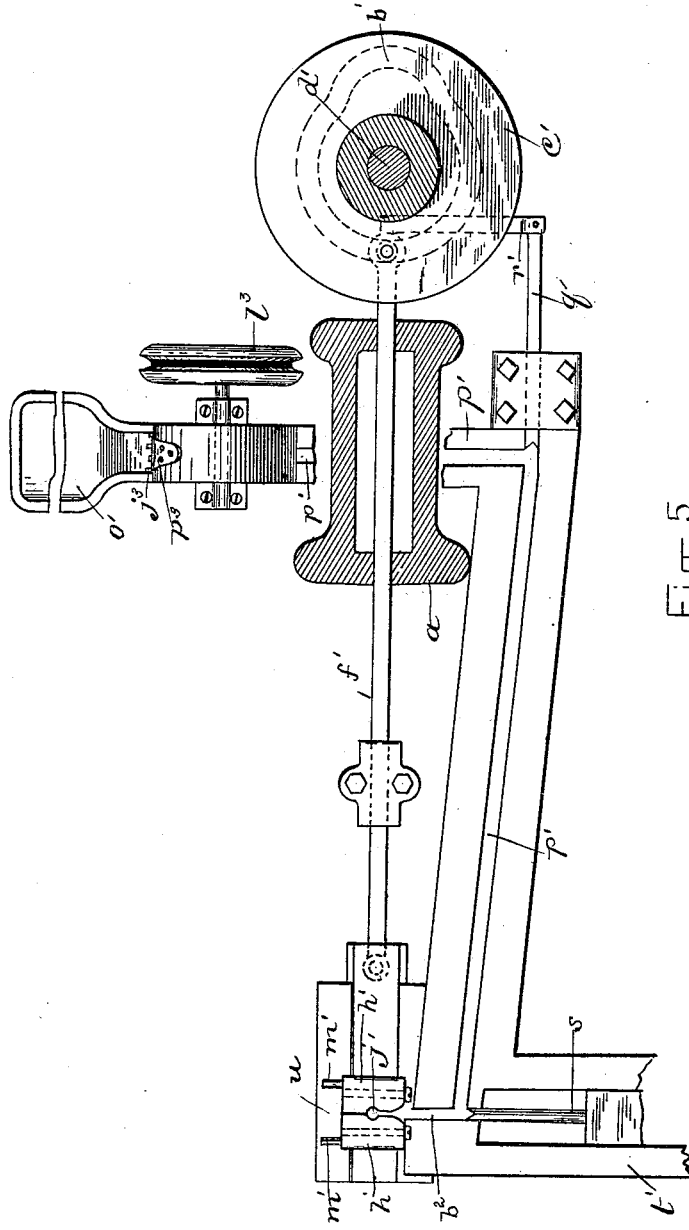
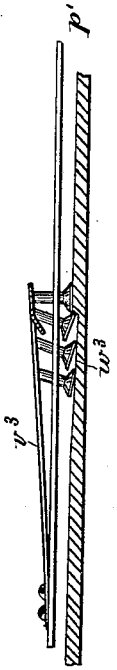
WITNESSES:
C. S. Gooding
H. Brown
INVENTORS:
J. L. Saxe,
N. M. Seelye,
F. W. Coy,
by Wright Brown & Crosley
Attys.

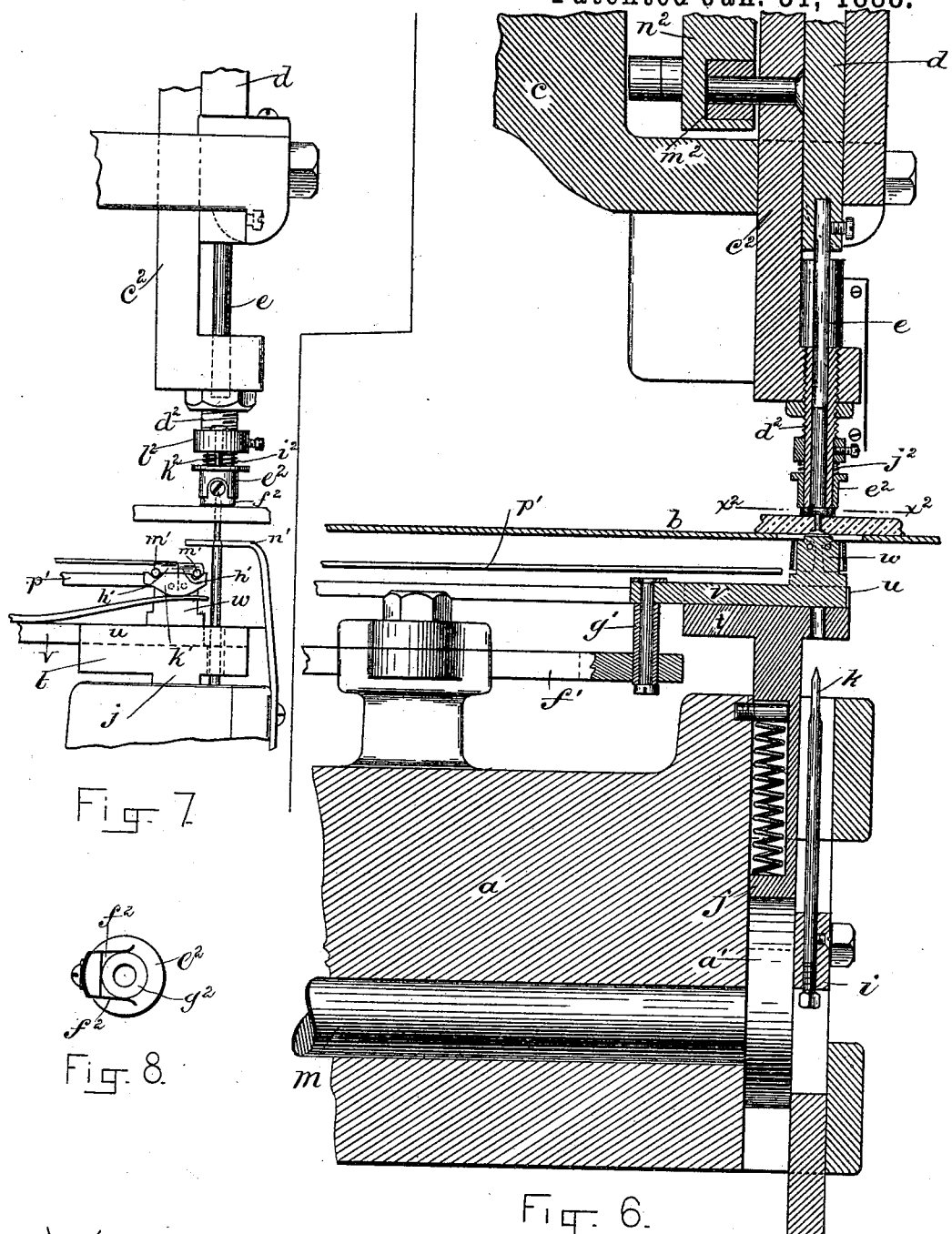

(No Model.) 6 Sheets—Sheet 5.

J. L. SAXE, N. M. SEELYE & F. W. COY.
RIVETING MACHINE.

No. 377,051. Patented Jan. 31, 1888.

WITNESSES:
C. S. Gooding
H. Brown.

INVENTORS:
J. L. Saxe,
N. M. Seelye,
F. W. Coy,
by Wright Brown & Crossley
Attys.

(No Model.) 6 Sheets—Sheet 6.

J. L. SAXE, N. M. SEELYE & F. W. COY.
RIVETING MACHINE.

No. 377,051. Patented Jan. 31, 1888.

WITNESSES.
C. S. Gooding
H. Brown

INVENTORS:
J. L. Saxe
N. M. Seelye
F. W. Coy
by Wright Brown & Crosley, Attys.

United States Patent Office.

JOHN L. SAXE, OF WATERBURY, CONNECTICUT, AND NORMAN M. SEELYE, OF CAMBRIDGE, AND FREDERICK W. COY, OF BOSTON, MASSACHUSETTS; SAID SEELYE AND COY ASSIGNORS TO SAID SAXE.

RIVETING-MACHINE.

SPECIFICATION forming part of Letters Patent No. 377,051, dated January 31, 1888.

Application filed January 3, 1887. Serial No. 223,309. (No model.)

*To all whom it may concern:*

Be it known that we, JOHN L. SAXE, of Waterbury, in the county of New Haven and State of Connecticut, NORMAN M. SEELYE, of Cambridge, in the county of Middlesex and State of Massachusetts, and FREDERICK W. COY, of Boston, county of Suffolk, and State of Massachusetts, have invented certain new and useful Improvements in Riveting-Machines, of which the following is a specification.

This invention relates to machines for inserting rivets in two or more superposed layers to be united and supplying burrs or washers to said rivets, the rivets being inserted from one side of the work and the burrs placed on the opposite side, the rivet-shanks being inserted through the holes in the burrs and upset therein, and thus united to the burrs.

In riveting-machines as heretofore constructed the organization has been such that the operations of making the holes for the rivets, inserting the rivets in said holes, and upsetting the ends of the rivets have required not less than two rotations of the driving-shaft, thus making the operation slower than is desirable, and the rivets have been inserted in the work from the upper side thereof, so that the operator has been obliged to turn the work to see if the burrs have been properly engaged with the rivets.

Our invention has for its object to enable the operations of punching the holes and of inserting and upsetting the rivets to be performed during a single rotation of the driving-shaft, and thus make the operation of the machine more rapid than heretofore.

The invention also has for its object to provide an organized machine capable of supplying the burrs to the upper side of the work and of inserting the rivets from the lower side, so that the upset ends of the applied rivets will always be in view of the operator.

To these ends our invention consists in the improvements which we will now proceed to describe and claim.

Figure 4:
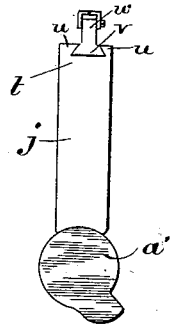
Figure 2:
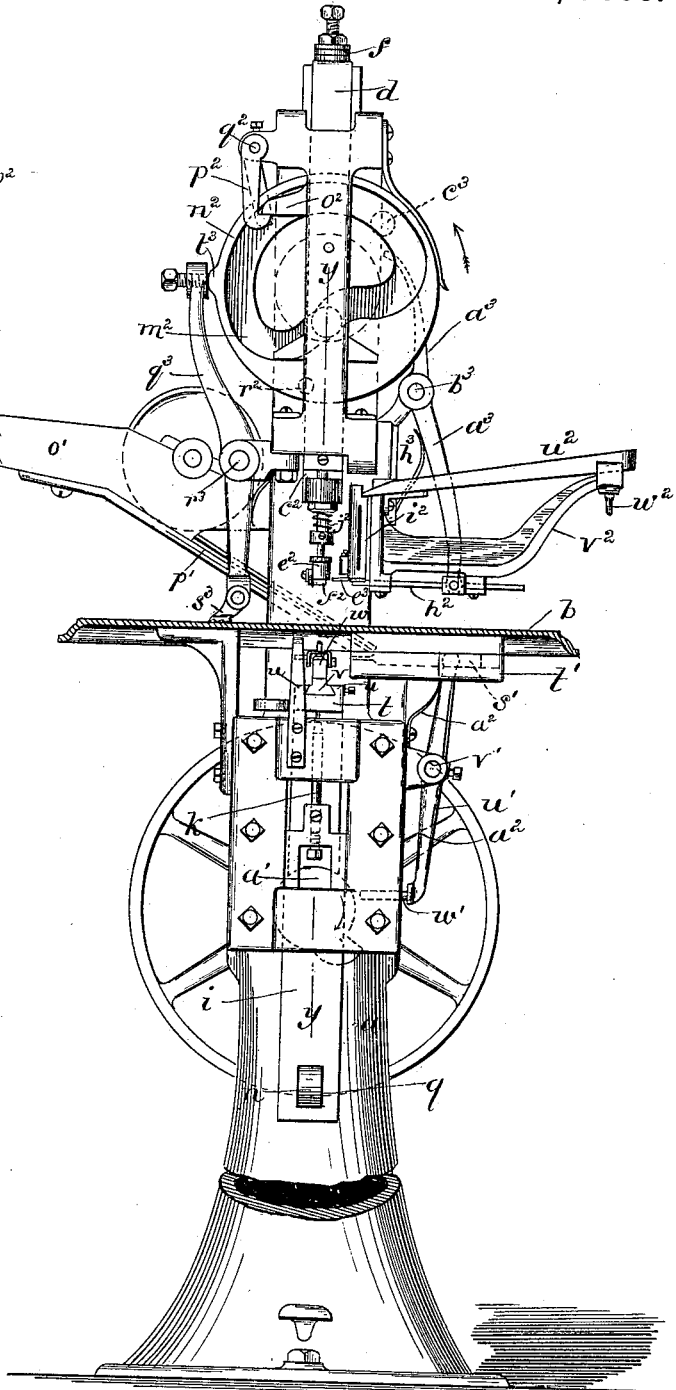
Figure 9:
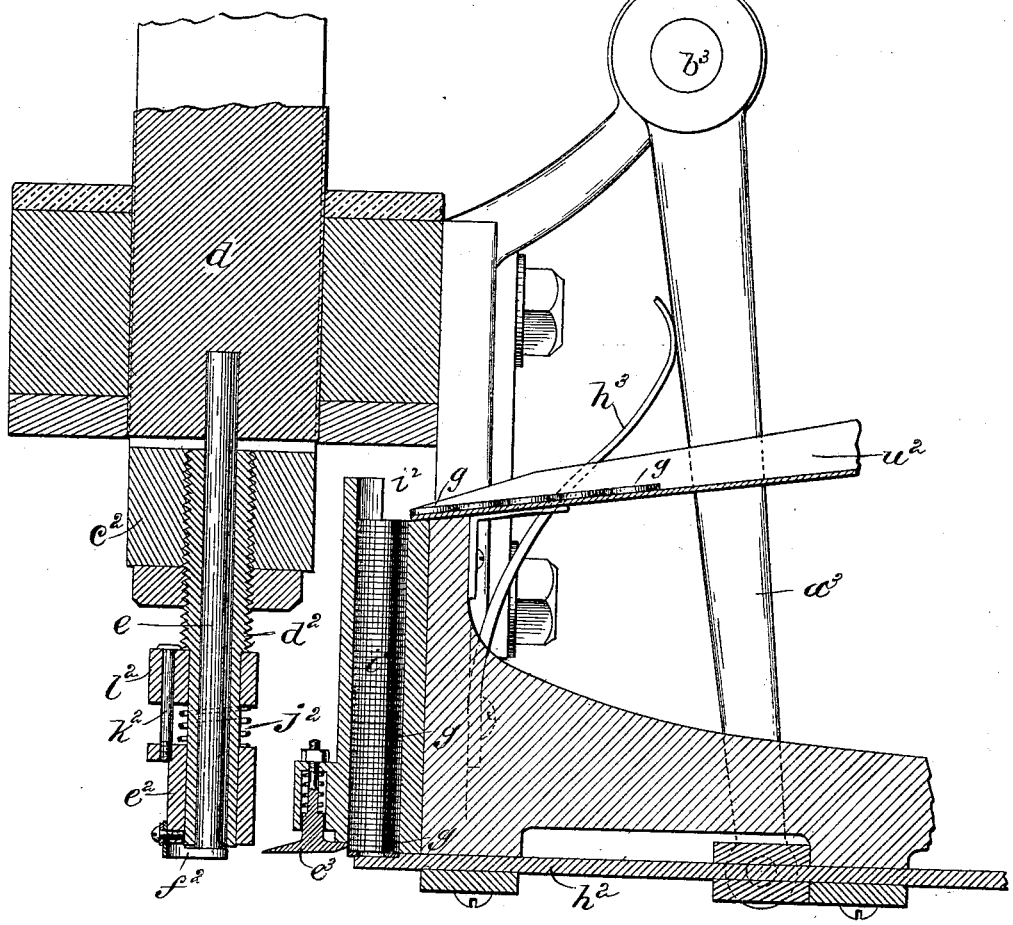
Figure 10:
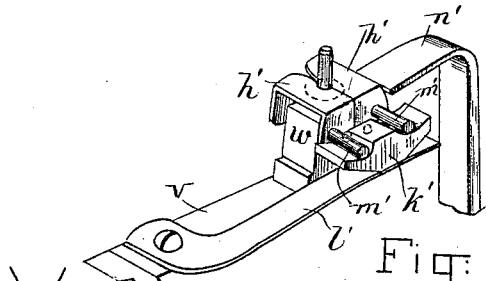
Figure 11:
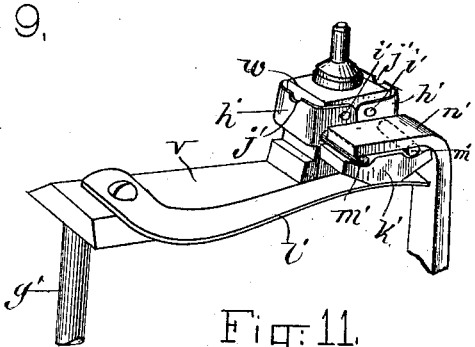
Figure 13:
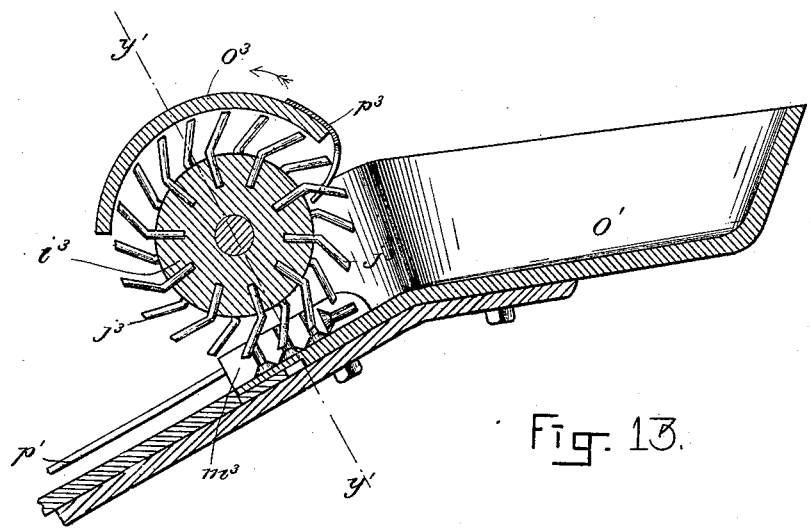
Figure 12:
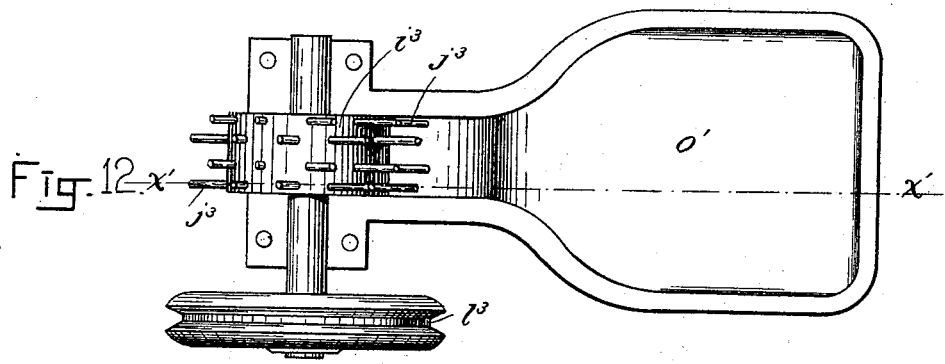
Figure 14:
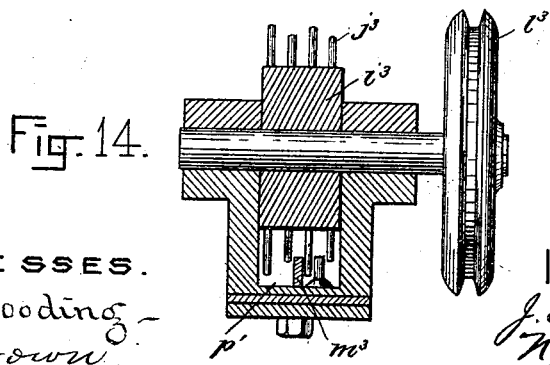

Of the accompanying drawings, forming a part of this specification, Figure 1 represents a side elevation of our improved machine. Fig. 2 represents a front elevation of the same. Fig. 3 represents an elevation of a portion of the side of the overhanging arm or goose-neck opposite to that shown in Fig. 1. Fig. 4 represents a front view of the anvil-carrying slide and its operating-cam. Fig. 5 represents a plan view of the parts of the machine below the line $x\, x$, Fig. 1. Fig. 6 represents a section, on a larger scale, on the line $y\, y$, Fig. 2. Fig. 7 represents a side elevation of a part of the machine, taken from the same side as Fig. 3. Fig. 8 represents a bottom view of the burr or washer holding device. Fig. 9 represents an enlarged section on line $z\, z$, Fig. 1. Figs. 10 and 11 represent perspective views of the anvil and its rivet-holding jaws and the means for holding the same closed and open, said jaws being closed in Fig. 10 and open in Fig. 11. Fig. 12 represents a top view of the rivet box or hopper and the distributer or agitator, which insures the proper entrance of the rivets into the raceway. Fig. 13 represents a section on line $x'\, x'$, Fig. 12. Fig. 14 represents a section on line $y'\, y'$, Fig. 13. Fig. 15 represents a sectional view of a portion of the rivet-race, showing a means of tilting the rivets.

The same letters of reference indicate the same parts in all the figures.

In the drawings, $a$ represents the supporting-frame, having a bed or table, $b$, and an overhanging arm or goose-neck, $c$. In the arm $c$ is located the vertical hammer-carrying slide $d$, which is provided with a hammer, $e$, adapted to upset the ends of the rivets, said slide being forcibly depressed by a spring, $f$, composed in this instance of a series of superposed leaves. One end of said spring bears on a part of the frame and its other end on the hammer-carrying slide $d$. A yoke, $g$, pivotally connected to the goose-neck, embraces the spring and has a screw, $h$, which bears upon the upper side of the spring and is capable of regulating the force thereof.

In the frame, below the work-supporting table $b$, are two vertical slides, $i\, j$, located side by side in a vertical guide in the frame. To the upper end of the slide $i$ is affixed an awl or punch, $k$, to perforate the work. The slide $i$ is reciprocated vertically by a cam, $l$, Fig. 1, on the driving shaft $m$ and a lever, $n$, pivoted at $o$ to the supporting-frame of the machine, the rear end of said lever being held by a spring, $p$, against the cam $l$, while its opposite end enters a slot, $q$, Fig. 2, in the lower portion of the awl-carrying slide $i$. The rotation of the driving-shaft causes the cam $l$ to oscillate the lever $n$, which in turn raises and lowers the slide $i$ and the awl or punch. The awl in rising passes through an aperture in the work-plate and through the material into a burr or washer, which is held against the upper side of the work by means hereinafter described.

The slide $j$, located beside the awl-carrying slide, has on its upper end a transverse head, $t$, on which are horizontal dovetail guides $u\ u$. Fitted to slide between said guides is a block, $v$, on which is an anvil, $w$, upon which the rivets to be inserted are placed by means hereinafter described. The anvil-carrying slide bears on a cam, $a'$, on the driving-shaft $m$, and is raised and lowered by said cam. The block $v$, which directly supports the anvil, rises and falls with the slide $j$, and is reciprocated horizontally by means of a cam-groove, $b'$, in a disk, $c'$, on the vertical shaft $d'$, which communicates motion from the driving-shaft $m$ to the shaft $e'$ in the goose-neck and a sliding rod, $f'$, having at one end a stud entering the cam-groove $b'$, and connected at its other end with the anvil-block $v$ by means of a vertical stud, $g'$, projecting downwardly from said block into an orifice in the rod $f'$, said connection enabling the anvil-block to rise and fall without the necessity of vertical movement of the rod.

The anvil $w$ is provided with two jaws, $h'\ h'$, which are pivoted to the sides of the anvil at $i'\ i'$, Fig. 11, and are capable of meeting over the anvil to grasp the shank of an inverted rivet, the head of which rests on the anvil, Fig. 10. The meeting edges of said jaws are provided with cavities $j'\ j'$, Fig. 11, formed to receive the rivet-shank, and said edges at one side of said cavities are flared outwardly from each other to form a tapering slot leading to the cavities, the outer end of said slot being wide enough to permit the entrance between the jaws of a rivet-shank, so that when said shank is pushed between the jaws by the means hereinafter described the jaws will be forced apart by the shank until the latter reaches the cavities $j'\ j'$ and is grasped thereby.

The jaws are normally held closed above the anvil by a block, $k'$, which is pressed upwardly by a spring, $l'$, against studs or pins $m'\ m'$, attached to and projecting laterally from the jaws. When the anvil is raised, as hereinafter described, said block and the pins $m'\ m'$ strike a fixed arm, $n'$, attached to the frame, and are arrested by said arm, so that the jaws open and release the rivet, as shown in Fig. 11.

$o'$ represents the rivet-hopper, supported at the rear of the machine. From said hopper extends a raceway or channel, $p'$, through which the rivets pass from the hopper to the devices which insert them in the material. Said raceway is composed of a bottom plate and two parallel guides on the upper surface of said plate, said guides being separated by a space of sufficient width to permit the passage between them of the shanks of the rivets, while their inner edges are beveled or undercut to accommodate the heads of the rivets, the surfaces of said heads sliding on the bottom plate. The rivets therefore pass from the hopper to the inserting devices in an inverted position and are inserted in the material in the same position, as hereinafter explained.

The portion of the raceway leading from the hopper is inclined, so that the rivets pass from the hopper by gravitation, while the remaining portion of the raceway is substantially horizontal, so that the rivets are moved horizontally under the work-supporting table and are kept near the plane of said table, and therefore require to be elevated by the anvil only a short distance to be inserted in the work, as hereinafter described.

The rivets in the horizontal portion of the raceway are moved positively forward by a feeding device, hereinafter described, though other equivalent means could be employed. We prefer to use as said feeding device a reciprocating slide, $q'$, connected by an arm, $r'$, to the reciprocating rod $f'$, which reciprocates the rivet-supporting anvil.

The feeding-slide $q'$ is timed to move the rivets exactly as fast as they are inserted in the work. The rivets are transferred from the outer end of the horizontal portion of the raceway to the anvil $w$ by a horizontally-moving slide, $s'$, which is reciprocated in a guide, $t'$, crosswise of the raceway by means of the cam $a'$ on the driving-shaft, a lever, $u'$, pivoted at $v'$ to an ear on the frame $a$, a rod or slide, $w'$, interposed between the cam $a'$ and the lower end of the lever $u'$, and a spring, $a^2$, which presses the lever so as to normally force its upper end away from the anvil. The upper end of the lever $u'$ is engaged with the rivet-transferring slide by entering a slot in said slide, so that when oscillated by the combined action of the cam $a'$ and spring $a^2$ it reciprocates the transferring-slide $s'$. When said slide is drawn back, the last rivet in the raceway $p'$ is forced out in front of the end of the slide by the rivet-feeding device $q'$, so that when the slide $s'$ is forced forward it pushes said rivet through a short lateral guide, $b^2$, communicating with the outer end of the raceway, and inserts it between the jaws $h'\ h'$, its head resting on the anvil and its shank projecting upwardly, as shown in Fig. 10.

$c^2$ represents a slide located beside the hammer-carrying slide in the goose-neck $c$ and in contact therewith. The slide $c^2$ has at its lower end an offset tubular throat, $d^2$, Fig. 6, into which the hammer $e$ projects.

$e^2$ represents a sleeve adapted to slide on said throat and extending below the same, said sleeve being provided with spring-fingers $f^2\ f^2$, formed to receive and hold between them a burr or washer, $g^2$, Fig. 8, which is inserted between said fingers by a feeding-slide, $h^2$, reciprocated, by means hereinafter described, across the bottom of a vertical reservoir, $i^2$, adapted to hold a vertical column of burrs. The burr-holding sleeve $e^2$ is pressed downwardly by a spring, $j^2$, its downward movement being limited by a headed pin, $k^2$, Fig. 9, attached to its upper end and sliding through a socket in a collar, $l^2$, rigidly attached to the throat $d^2$, the head of the pin $k^2$ bearing against the upper surface of the collar $l^2$. The sleeve $e^2$ is therefore capable of yielding upwardly when pressed against the work, as hereinafter described, thus accommodating itself to the thickness of the work.

The slide $c^2$, supporting the burr-holding sleeve, is reciprocated vertically by a cam-groove, $m^2$, in a disk, $n^2$, on the shaft $e$, journaled in the arm or goose-neck. When the slide $c^2$ is raised by said cam-groove, its offset lower end bears on the lower end of the hammer slide $d$ and raises the latter until an arm, $o^2$, on the hammer-slide is engaged by a spring-actuated latch, $p^2$, on a rock-shaft, $q^2$, said latch engaging automatically with the arm $o^2$ and holding the hammer-slide elevated until the latch is moved to disengage it from said arm and release the hammer-slide by contact of a stud, $r^2$, Figs. 2 and 3, on the rear side of the disk $n^2$ with an arm, $s^2$, on the rock-shaft $q^2$. A spring, $t^2$, on the rock-shaft $q^2$ gives the latter a tendency to turn in the direction required to engage the latch $p^2$ with the arm of the hammer-slide $d$.

The burrs are supplied to the reservoir $i^2$ from a chute or tray, $u^2$, which is supported at its rear end by a bracket, $v^2$, attached to the goose-neck $c$. Said chute or tray is attached to the bracket $v^2$, and is vertically adjustable by means of a screw, $w^2$, working in the outer end of the bracket $v^2$. In this way the inclination of the hopper may be varied.

The burrs are caused by the jar attending the operation of the machine to slide down the inclined chute or tray $u^2$ and drop from thence into the reservoir $i^2$. The slide $h^2$, that feeds the burrs from the reservoir $i^2$ to the holding-fingers $f^2 f^2$ on the sleeve $e^2$, is reciprocated horizontally in guides on the bracket $v^2$ by means of a lever, $a^3$, pivoted at $b^3$ to an ear on the goose-neck, and having one arm jointed to the slide $h^2$ and its other arm arranged in the path in which a stud, $c^3$, on the rear side of the disk $n^2$ travels. When said stud encounters the lever $a^3$, it turns the latter on its fulcrum, so that the lever pushes the slide $h^2$ forward and causes its forward end to move the bottom burr from the column in the reservoir $i^2$ and push it under a spring-depressed presser-foot, $e^3$, to the spring-fingers of the sleeve $e^2$. The slide $h^2$ is of greater thickness than a burr $g^2$, and has in its upper surface at its forward end a recess of a depth nearly or quite equal the thickness of a burr. The lowest burr in the column drops into said recess and remains in it until it is thrust between and grasped by the spring-fingers $f^2 f^2$. After the burr-feeding movement of the slide $h^2$ the stud $c^3$ passes by and releases the lever $a^3$, whereupon a spring, $h^3$, forces said lever in the opposite direction and causes it to force the slide $h^2$ back to the position shown in Fig. 9, its recess again receiving the bottom burr in the reservoir $i^2$.

The operation of the machine above described is as follows: The superposed layers of material to be riveted—such as the ends of a piece of belting—are placed on the work-table, and the burr-holding sleeve, having a burr inserted between its spring-fingers, is depressed and caused to bear upon the upper surface of the work, thus holding the latter in position on the work-table. The awl or punch then rises and perforates the work, the hole coinciding with the hole in the burr held by the fingers $f^2 f^2$. After the awl recedes, the anvil, having a rivet between its jaws, is moved horizontally until the rivet stands exactly under the hole in the work. The anvil is then raised by the slide $j$, the shank of the rivet being thus inserted in the hole in the work and in the burr. While the anvil is raised, the hammer $e$ descends and upsets the end of the rivet-shank, thus uniting the rivet and burr. The anvil is then lowered and drawn back, and the slide $c^2$, having the burr-holding sleeve, is raised, its offset lower end bearing against the hammer-slide $d$ and raising the latter. The hammer-slide is engaged by the latch $p^2$, and thus retained in its raised position. A burr is then inserted between the fingers $f^2 f^2$ of the burr-holding sleeve, and a rivet is transferred to the anvil and held by the jaws $h' h'$, and thus the operation is continued.

It will be seen from the foregoing that the rivets are presented with their points upwardly and inserted from the under side of the work, the burrs being on the upper side. The operator is therefore enabled to see whether each rivet is properly engaged with a burr without the necessity of turning the work over and looking at its under side, as is necessary when the rivets are inserted from the upper side of the work, as heretofore. To cause the rivets to pass properly from the hopper $o'$ into the inclined portion of the raceway $p'$, we provide at the upper end of the latter an agitator consisting of a rotating shaft, $i^3$, journaled in suitable fixed bearings and provided with an enlargement in which are set a number of pins, $j^3$, which stand in planes at right angles to the axis of the shaft $i^3$, and may be arranged as clearly shown in Fig. 13. The agitator is arranged over the inclined lower portion of the hopper, and is rotated in the direction indicated by the arrow in Fig. 13 by a belt running from a pulley, $k^3$, on the shaft $e'$ to a pulley, $l^3$, on the shaft $i^3$, Fig. 1. The arrangement of the pins $j^3$ is such that a rivet cannot pass down the inclined portion of the hopper under the agitator unless it rests on its head, with its shank projecting upwardly, as shown in Figs. 13 and 15.

A partition, $m^3$, under the agitator divides the passage through which the rivets pass under the agitator into two parts, each of which is of sufficient width for the passage through it of one rivet at a time. The agitator stirs the rivets that gravitate against it, and such of the rivets as are caused by the agitator to assume the position indicated slide down into the raceway, which is kept full by the continuous operation of the agitator. A casing, $o^3$, partially covers the agitator, and a comb-shaped plate, $p^3$, having teeth projecting over the side of the agitator next to the reservoir, prevents the rivets from getting caught between the pins $j^3$ and carried out of the receptacle by the rotation of the agitator.

We prefer to make the heads of the rivets overlap each other in the horizontal portion of the raceway, as shown in Fig. 15, so that they will be closely packed and will not be likely to be displaced. To this end we secure a spring, $v^3$, to the raceway, the free end of said spring projecting over the channel in the raceway and being formed to bear against the upper ends of the rivets and tip them and cause their heads to overlap, as shown, the rivet-head-supporting surface of the raceway being provided with a recess, $w^3$, which facilitates the overlapping of the rivet-heads.

We prefer to provide the machine with a work-feeding lever, $q^3$, pivoted at $r^3$ to an ear on the goose-neck, and having a foot, $s^3$, jointed to its lower end and bearing on the work. The upper end of said lever bears against the periphery of the disk $n^2$ and is moved intermittingly by a cam, $t^3$, on said disk, and is thus caused to feed the work. The feeding-lever may be arranged to bear against either side of the disk $n^2$ instead of against its periphery, in which case the disk would be provided with a cam, $t^3$, on the side against which the feed-lever bears, and would oscillate the lever at right angles to the direction in which it is oscillated by the cam $t^3$.

It will also readily appear that the setting-hammer may be forced down by other means than by the spring $f$. It will also be observed that by arranging the awl or punch and the rivet-inserting anvil below the work and the upsetting device or hammer above the work, feeding the rivets in an inverted position to the anvil below the work, and providing independent devices for operating the awl or punch and the anvil so that they may be interchanged and operated in quick succession, we are enabled to perform the entire operation of punching, inserting the rivet, and upsetting the end of the rivet during one rotation of the driving-shaft of the machine, the punch and awl acting alternately in quick succession to form a hole and insert a rivet therein during a part of a rotation of the driving-shaft, while the upsetting-hammer acts to upset the rivet during the completion of said rotation.

The rapidity of operation resulting from the arrangement just indicated is the chief advantage of our invention, although the capability of seeing the burrs on the upper side of the work previously referred to is also a very important advantage secured by the described organization of the machine.

We claim—

1. In a riveting-machine, the combination of a rivet-raceway receiving inverted rivets under the work, a laterally and vertically movable anvil located below the plane of the work, adapted to receive the rivets from the raceway and to insert them in the work, mechanism, substantially as described, for operating said anvil, and a heading device arranged above the plane of said work and mechanism for operating it, substantially as described.

2. In a riveting-machine, substantially as herein described, the combination of a raceway and feeding mechanism co-operating therewith adapted to feed inverted rivets under the work, a rivet-inserting anvil located and operating below the plane occupied by the work to be riveted and which receives the rivets from said raceway, mechanism to operate said anvil, burr feeding and holding mechanism whereby burrs are held to receive the rivets, and a heading device and mechanism to operate it, said feeding and holding mechanism and heading device being located and operating above the plane occupied by said work, as set forth.

3. In a riveting-machine, substantially as herein described, the combination of a raceway and feeding mechanism co-operating therewith adapted to feed inverted rivets under the work, a punch or awl adapted to enter the work from below, a rivet-inserting device or anvil which is interchangeable in position with the awl, independent mechanism, substantially as described, for successively operating the awl and anvil, and an upsetting device or hammer located above the plane of the work and mechanism to operate it, whereby the upper ends of the inverted rivets are upset, as set forth.

4. In a riveting-machine, the combination of a vertically-movable anvil, a rivet-conducting raceway, means, substantially as described, for feeding the rivets positively and intermittingly through the raceway to the anvil, a burr-holding reservoir above the rivet-raceway, means for feeding the burrs from said reservoir to the upper surface of the work, means, substantially as described, to raise the anvil and insert the rivet thereon through the work and into the burr held thereon, and an upsetting-hammer and means to operate it, whereby the ends of the rivet-shanks are upset at the upper surface of the work, as set forth.

5. In a riveting-machine, the combination of a work table or plate, an anvil vertically movable in an opening in said plate, a rivet-conducting raceway extending substantially horizontally under said table, means, substantially as described, for feeding the rivets intermittingly forward through said raceway to the anvil, a burr-holding reservoir above the work-plate, means for feeding burrs singly from said reservoir to the upper surface of the work, means, substantially as described, for raising the anvil and causing it to insert a rivet upwardly through the work and into the burr held on its upper surface, and an upsetting-hammer and means to operate it, whereby the ends of the rivet-shanks are upset at the upper surface of the work, as set forth.

6. In a riveting-machine, substantially as herein described, the combination of an awl or punch and means to reciprocate it vertically, a vertically and horizontally movable anvil, said awl and anvil being located below the plane of the work, means for reciprocating said anvil horizontally and vertically, a rivet-conducting raceway, means, substantially as described, for feeding the rivets intermittingly forward to the anvil when the latter is depressed and moved back from its rivet-setting position, an elevated burr-holding receptacle, and means for feeding the burrs from said reservoir to the upper surface of the work at the point where the rivets are inserted by the anvil, and an upsetting-hammer above the plane of the work and means to operate it, whereby the ends of the rivets are upset at the upper surface of the work, as set forth.

7. In a riveting-machine, substantially as herein described, the combination of the burr feeding and holding devices, the upsetting-hammer above the plane of the work and its operating mechanism, the rivet-raceway formed to guide the inverted rivets, the feeding devices whereby the rivets are intermittingly fed through said raceway, the anvil below the plane of the work having the rivet-holding jaws, and mechanism, substantially as described, for moving said anvil to alternately hold it in position to receive a rivet from the raceway and insert said rivet in the work, as set forth.

8. The combination of the burr feeding and holding devices, the upsetting-hammer above the plane of the work and its operating mechanism, the rivet-raceway formed to guide the inverted rivets, the feeding devices whereby the rivets are intermittingly fed through said raceway, the anvil below the plane of the work having the rivet-holding jaws, the awl or punch and mechanism to reciprocate it vertically, and mechanism, substantially as described, for moving said anvil horizontally to first hold it in position to receive a rivet from the raceway, and then over the awl or punch, and mechanism for vertically reciprocating the anvil when it is in the last-named position, and thereby cause it to insert the rivet into the work, as set forth.

9. In a riveting-machine, the combination of a rivet-receptacle, a raceway leading therefrom to rivet-inserting devices and having a portion inclined and a portion horizontal, and means, substantially as described, for positively moving through the horizontal or nearly horizontal part of the raceway the rivets that gravitate through the inclined part, as set forth.

10. In a riveting-machine, the combination of a rivet-receptacle, a raceway leading therefrom to a rivet-inserting anvil and having a portion inclined and a portion horizontal, means, substantially as described, for positively and intermittingly feeding the rivets through the horizontal portion of the raceway, and a transferring slide and mechanism to reciprocate it crosswise of the raceway, whereby the rivets are transferred from the raceway to the anvil, as set forth.

11. The combination of the rivet-raceway formed to hold the rivets inverted, and the rivet-inclining spring $v^3$, whereby the heads of the rivets in the raceway are caused to overlap.

12. In a riveting-machine, the combination, with the upsetting device and the anvil arranged, respectively, above and below the plane of the work, and operating devices therefor, of the rivet-receptacle, the raceway leading therefrom formed to receive the rivets in inverted position, and the agitator composed of the continuously-rotated shaft and the pins set therein, arranged close to the entrance of the raceway to engage the shanks of the rivets and turn them upon their heads, so as to cause the rivets to enter the raceway properly positioned, as set forth.

13. The combination of the anvil, the rivet-raceway, mechanism, substantially as described, for positively and intermittingly feeding rivets through the raceway to the anvil, retaining devices, substantially as described, for holding said rivets on the anvil, means for moving the anvil, as described, and a fixed stop which acts on the rivet-retaining devices during the upward movement of the anvil and releases the rivet, as set forth.

14. The combination of the anvil, the mechanism for supplying rivets thereto, the jaws $h'\ h'$, pivoted to the anvil and normally held together by yielding pressure, means for raising and depressing the anvil, and an arm or stop which opens the jaws when the anvil is raised.

15. The combination of the anvil having the pivoted jaws $h'\ h'$, the spring-pressed block $k'$, bearing against pins $m'\ m'$ on said jaws and normally closing the latter over the anvil, and the arm $n'$, which arrests the block $k'$ and opens the jaws, as set forth.

16. In a riveting-machine such as described, the combination of a work plate or table, the reciprocating anvil, means for supplying inverted rivets thereto, reciprocating punch or awl, a vertically-reciprocating burr-holder, a burr-reservoir, and means, substantially as described, for moving the burrs from the reservoir to the burr-holder, as set forth.

17. The combination of the slide $c^2$, means for reciprocating it vertically, the yielding burr-holding sleeve $e^2$, carried by the slide $c^2$ and provided with spring-fingers $f^2\ f^2$, and means, substantially as described, for inserting burrs between said fingers when the sleeve $e^2$ is raised, said sleeve bearing with a yielding pressure on the work and holding the burr against the same when the slide $c^2$ is depressed, as set forth.

18. The combination, with the anvil, its operating mechanism, and the rivet-supplying mechanism, of the hammer-carrying slide d, a spring to depress it, the slide c², having the offset tubular throat which receives the hammer, and the yielding burr-holding sleeve on said throat, means for vertically reciprocating the slide, and thereby causing it to first press the burr-holding sleeve against the work and then raise said sleeve with the hammer, means, substantially as described, for inserting burrs in the burr-holding throat when the latter is raised, a latch which automatically engages the hammer-slide when the latter is raised, and means, substantially as described, for releasing the hammer-slide when the burr-holding sleeve is depressed upon the work and the anvil raised, as set forth.

19. The combination of the burr-reservoir, the reciprocating slide which moves the burrs from the reservoir, the vertically-reciprocating burr-holding sleeve, and the spring-presser e³ between said reservoir and sleeve, whereby the burrs are held down upon the slide during their passage from the reservoir to the sleeve, as set forth.

20. In a riveting-machine such as described, the combination of the rivet-supplying mechanism, the burr-supplying mechanism, the upsetting device, a work plate or table, and a work-feeding device whereby the work is moved when desirable.

21. In a riveting-machine such as described, the combination of a rivet receptacle and raceway extending therefrom, and devices for feeding rivets in said raceway, a vertically and laterally movable anvil and mechanism for moving it, a device, substantially as described, for holding the rivets on the anvil, and a heading device opposite the anvil, whereby the anvil is adapted to receive a rivet from the raceway, move it to a position in line with the hole in the work, and by a vertical movement thrust it through the same in position to be operated upon by the heading device, substantially as described.

22. In a riveting-machine, substantially as herein described, the combination, with the rivet-receiving receptacle and feeding mechanism adapted to feed rivets to the anvil, an anvil to which the rivets are fed, devices for holding them in position thereon, and mechanism, substantially as described, for moving said anvil so as to bring the rivet in line with the hole in the work and moving it to thrust the rivet through the same, of a burr-holding receptacle, feeding devices for placing burrs in position on one side of the work opposite the rivet, and a heading device arranged to upset the end of the rivet, the head resting all the time in contact with the anvil, substantially as described.

23. In a riveting-machine, the combination, with the rivet-receiving receptacle and feeding mechanism adapted to feed rivets to the anvil, an anvil to which the rivets are fed, devices for holding them in position upon the anvil, and mechanism, substantially as described, for moving the said anvil so as to bring the rivet in line with the hole in the work and moving it to thrust the rivet through the same, of a punch for cutting the hole in the work, operating on the side from which the rivet is inserted, and a heading device located on the side of the work opposite the anvil for co-operating with the anvil to head the rivet, substantially as described.

24. In a riveting-machine, substantially as herein described, the combination, with the work-table having an aperture therein, a punch and a rivet holding anvil located on one side the table, mechanism, substantially as described, for alternately placing the punch and anvil in line with said aperture, and rivet-feeding devices for placing rivets upon the anvil when removed from the aperture, of a heading device located on the side of the table opposite the punch and anvil, and mechanism, substantially as described, for operating it, as set forth.

25. In a riveting-machine, substantially as herein described, the combination of a work-support, a punch or awl arranged to enter the work from one side, burr-feeding devices, substantially as described, whereby burrs are placed in position on the opposite side of the work from the awl, so that each burr will be centered by the movement of the awl, a rivet-inserting anvil interchangeable in position with the awl, independent mechanisms, substantially as described, whereby the awl and anvil are successively operated, feeding devices whereby rivets are supplied to the anvil, and an upsetting-hammer located opposite the anvil, and mechanism to operate said hammer, whereby the rivets are upset on the anvil.

26. In a riveting-machine, the combination of a work-support, a punch or awl arranged to enter the work on said support from below, burr-feeding devices, substantially as described, whereby burrs are placed upon the upper surface of the work over the awl, so that each burr will be centered by the upward movement of the awl, a rivet-inserting device or anvil which is interchangeable in position with the awl, independent mechanism, substantially as described, whereby the awl and anvil are successively operated, feeding devices whereby inverted rivets are supplied to the anvil, and an upsetting-hammer located above the plane of the work, and mechanism to operate said hammer, whereby the upper ends of the inverted rivets are upset.

27. In a riveting-machine, substantially as herein described, the combination of a raceway and feeding mechanism co-operating therewith adapted to feed inverted rivets under the work, a punch or awl adapted to enter the work from below, burr-feeding devices, substantially as described, whereby burrs are placed upon the upper surface of the work over the awl, so that each burr will be centered by the upward movement of the awl, a rivet-inserting device or anvil which is interchangeable in position with the awl, independent mechanisms, substantially as described, for successively operating the awl and anvil, and an upsetting device or hammer located above the plane of the work, and mechanism to operate it, whereby the upper ends of the inverted rivets are upset, as set forth.

28. The combination, with a work-support, of a device for holding the burrs in contact with the work, a punch for penetrating the work and centering the burr, and connections between the burr-holder and punch, whereby the punch will pass through the work while the burr is in contact therewith, and means for introducing the rivets through the punched holes and burrs, and a heading device for heading them, substantially as described.

In testimony whereof we have signed our names to this specification, in the presence of two subscribing witnesses, this 10th day of December, 1886.

JOHN L. SAXE.
NORMAN M. SEELYE.
FREDK. W. COY.

Witnesses to John L. Saxe and Norman M. Seelye:
    C. F. BROWN,
    J. B. HAWKINS.

Witnesses to Frederick W. Coy:
    C. F. BROWN,
    A. D. HARRISON.